United States Patent [19]

Kando et al.

[11] Patent Number: 4,683,646

[45] Date of Patent: Aug. 4, 1987

[54] THERMAL HEAD METHOD OF MANUFACTURING

[75] Inventors: Giichi Kando, Morioka; Makoto Tomoyori, Iwate, both of Japan

[73] Assignee: Alps Electric Co, Ltd., Japan

[21] Appl. No.: 770,652

[22] Filed: Aug. 28, 1985

[30] Foreign Application Priority Data

Aug. 28, 1984 [JP] Japan ............................... 59-178859

[51] Int. Cl.[4] ........................ H05B 3/00; G01D 15/10; B05D 1/36

[52] U.S. Cl. ........................................ 29/611; 29/620; 29/621; 219/216; 338/308; 338/309; 346/76 PH; 427/58; 427/402; 430/311; 437/51

[58] Field of Search .................... 219/216; 346/76 PH; 29/611, 620, 621, 577 C; 338/308, 309; 427/58, 402; 430/311

[56] References Cited

U.S. PATENT DOCUMENTS 4,259,564 3/1981 Ohkubo et al. ...................... 219/216
4,296,309 10/1981 Shinmi et al. ........................ 219/216
4,343,986 8/1982 Mitani et al. ........................ 219/216
4,367,395 1/1983 Asakawa et al. .................. 219/216

FOREIGN PATENT DOCUMENTS 59-79775 5/1984 Japan ............................. 346/76 PH

*Primary Examiner*—Clifford C. Shaw
*Assistant Examiner*—Gerald E. Preston
*Attorney, Agent, or Firm*—Guy W. Shoup

[57] ABSTRACT

Disclosed is a thermal head and a method of manufacturing the same, in which a heating portion provided with at least a heating resistor film, a conductor film and a protection film and formed on a substrate having a center-raised stripe and made of an electrically insulating material having anisotropy or selectivity with respect to etching is integrated with a lead wire portion separate from the heating portion and having lead wires formed on an electrically insulating substrate by connecting conductors of the heating portion with respective and corresponding ones of the lead wires of the lead wire portion.

1 Claim, 13 Drawing Figures

THERMAL HEAD METHOD OF MANUFACTURING

BACKGROUND OF THE INVENTION

1. Field of the Invention

The present invention relates to a thermal head for use in a thermal recording apparatus such as a facsimile, a printer, or the like, and a method of manufacturing the same.

2. Description of the Prior Art

Recently a thermal recording system has been introduced in large quantities, because of its good printing quality and inexpensive running cost. Generally, there are two types of thermal heads which are the core portion of the thermal recording system: one is a line type thermal head having a heating portion provided with heating dots alined along the entire transversal length of a printing paper; and the other is a serial type thermal head having a heating portion provided with heating dots longitudinally alined over the length of one character to be printed. According to the extension of the thermo-sensitive system, the development of inexpensive thermal heads with higher resolution has been demanded. Today, there are three types of thermal heads, that is a thick film type, a thin film type, and a semi-conductor type. The thin film type thermal head has become the main current as the demand of the high resolution described above become strong. As for cost down, since the above-mentioned three types of thermal heads utilize a sputtering or evaporation method to form a film structure it is strongly desired to efficiently form a film structure in order to realize cost down.

Each of the conventional thermal heads of such a serial head type as shown in FIG. 7 and of such a line head type as shown in FIGS. 8 and 9 has a pattern constituted by a heating portion 6 for actually performing printing and a lead wire portion 7 for connecting the heating portion 6 with the outside. As shown in FIG. 10, the heating portion 6 is constituted by: an undercoating film 13 formed on an electrically insulating substrate 1 of such as ceramics, glass, or the like, for improving tightness between the substrate 1 and the construction film of the head; a heating resistor film 2; a conductor film 3; an oxidation resisting film 4 for the heating resistor 2; and a wear resisting film 5 for protecting the head, these films 2, 3, 4, and 5 being layered one on one in the order described. As the substrate used in a thermal head, such a substrate having a glass glaze 14 as shown in FIG. 11 may be employed in order to improve tightness as well as thermal response between the heating portion 6 and the printing paper. The two systems described above, however, have the same film structure of thermal head and the conductor film 3 is formed on the heating resistor film 2.

As the method of producing the film type thermal heads, such a method is employed in which a plurality of thermal heads are produced at a time from a single sheet of insulator substrate 1 made of ceramics, glass, or the like, and which has the steps of forming the undercoating film 13 all over the surface of the insulator substrate 1, forming the heating resistor film 2 by printing, spattering, or evaporation, forming the conductor film 3 on the resistor film 2, and forming a predetermined head pattern by using the photo-lithographic technique. Then the oxidation resisting film 4 for the heating portion and the wear resisting film 5 are formed by spattering, or the like, to cover the head pattern throughout the substrate 1 to complete the heads. Upon completion, the heads are divided into individual ones along snap lines put into the substrate 1 beforehand or divide the substrate 1 by using a die device.

As described above, since the conventional thermal head has a construction formed in such a manner that a plurality of thermal heads each having the heating portion 6 and the lead wire portion on the same substrate are produced by the same steps, the oxidation resisting film 4 for protecting the heating resistor film 2 of the heating portion 6 and the wear resisting film 5 are formed not only on the heating portion 6 but also on the lead wire portion 7 which is unnecessary to be protected and which occupies a most part of the area of the thermal head. The structure is therefore useless in film forming. Further, there is such irrationality that the number of the heads to be produced from one sheet of the substrate is limited not by the size of the heating portion 6 but by the size of the lead wire portion 7 because the heating portion 6 and the lead wire portion 7 are constituted on the same substrate as described above. Further more, there is such a disadvantage that there is a risk of damage such as crack or distortion even in the heating portion 6 of each thermal head when the substrate is divided into individual thermal heads because the division of performed by using physical force such as by applying external force along the snap lines on the substrate or by using die device.

SUMMARY OF THE INVENTION

Accordingly, it is an object of the present invention to provide a thermal head and a method of manufacturing the same, in which the efficiency of forming an oxidation resisting film, an wear resisting film, and the like, is improved by assembling a heating portion and a lead wire portion prepared respectively individually by separate steps, and in which a manufacturing cost is lowered by eliminating damage of the heating portion in the manfacturing process.

According to the present invention, a material having anisotropy and selectivity with respect to etching is used as a substrate material of the thermal head and in forming films of the thermal head a heating resistor film is formed on a conductor film, whereby it is made possible to produce a heating portion and a lead wire portion separately from each other to improve efficiency in film forming and to prevent crack and distortion from occurring in the dividing operation in the process of producing the substrate.

That is, the thermal head according to the present invention is featured in that a heating portion provided with at least a heating resistor film, a conductor film and a protection film and formed on an substrate having a center-raised stripe and made of an electrically insulating material having anisotropy or selectivity with respect to etching is integrated with a lead wire portion separate from the heating portion and having lead wires formed on an electrically insulating substrate by connecting conductors of the heating portion with respective and corresponding ones of the lead wires of the lead wire portion.

Here, the anisotropy with respect to etching treatment is such a characteristic that the etching speed as to a specific etching liquid is different depending on a crystalized face of a crystal. For example, a silicon monocrystal has such a characteristic that the etching speed as to an etching liquid of KOH, or the like, makes a distinction between crystal faces "100" and "111". When a silicon substrate 9 having such a crystal face "100" as shown in FIG. 12 as a surface thereof is formed with a protection film 10 having a desired pattern and etched with the above-mentioned etching liquid, the substrate has such a characteristic that it becomes possible to form a V-shaped or a trapezoidal groove having a side face which is a crystal face "111" as shown in FIG. 13, because the etching speed of a crystal face "100" is faster than that of a crystal face "111". Such etching is called anisotropy one.

The selectivity with respect to etching treatment is such a characteristic that it is possible to work with a desired pattern in a manner such that irradiating ultraviolet rays are irradiated by using a given mask such as photosensitive glass and a latent image portion made in a glass portion is then crystalized through heat treatment, or the like, by irradiating ultraviolet rays, on the basis of the difference in etching speed with respect to the etching liquid such as fluoric acid, or the like, between the crystalized portion and the glass portion. Accordingly, it is possible to use silicon monocrystal, photosensitive glass, or the like, having such characteristics as described above, as a substrate materials. Further, it is possible to accurately perform shaping and division of the substrate by etching.

The heating resistor film constituting the heating portion together with the substrate, the conductor film, and the protection film are known materials. Although the protection film is constituted by an oxidation resisting film for preventing the heating resistor film from being oxidized and a wear resisting film for protecting the heating portion itself, it may have another film structure having other films by request. Further the heating portion may have an undercoating film for improving tightness between the substrate and the heating resistor film.

As to the formation order of the conductor film and the heating resistor film on the substrate, it is desirable to arrange these films on the substrate outwardly in the order of the conductor film and the heating resistor film in view of connection between these films and the lead wires of the lead wire portion.

The film thickness is selected to a value ordinarily used in thermal heads.

The substrate of the lead wire portion may be made of a substrate material ordinarily used in thermal heads. Of course, a substrate material having such characteristics as described above may be used.

The method of manufacturing thermal heads according to the present invention comprises the steps of: forming, by etching, a plurality of center-raised stripes on a substrate material having anisotropy or selectivity with respect to etching; forming at least a heating resistor film, a conductor film and a protection film on the surface of each of the center-raised stripes of the substrate; making the plurality of center-raised stripes independent from each other by etching a face of the substrate opposite to the face on which the films are formed; dividing the portion on which the films are formed for every center-raised stripe into heating portions; and connecting conductors of each of the heating portions to respectively corresponding lead wires of a lead wire portion prepared separately from the heating portion by forming the lead wires on an electrically insulating substrate.

In the method according to the present invention, materials having the above-mentioned characteristics are used for the substrate materials and various kind of films. When a plurality of the center-raised stripes are made from the substrate material, it is desirable that a $SiO_2$ film, for example, as a protection film against anisotropy etching is attached on the substrate material, a predetermined pattern is formed by photo-lithography, and then anisotropy etching is performed. The conductor film and the heating resistor film are made to have a predetermined thickness by spattering, evaporation, or photo-lithography. The protection film is formed on those films. In order to reinforce a film forming face, a film such as photo-resisting one which is easy to tear off at a later step may be attached thereto. To make the plurality of center-raised stripes independent is performed by etching or lapping the surface of the substrate material opposite to the other surface of the same on which the films are formed till the conductor face is exposed. The division of the film layered portion for every center-raised stripe is performed by cutting by a mechanical cutter or by using laser, or the like.

The lead wire portion is formed in the step separately from the heating portion in such a manner that lead wires are formed on an ordinarily used electrically insulating substrate by an ordinary method. The lead wire portion is fixedly coupled with the heating portion by connecting the lead wires with the respective corresponding conductors of the heating portion by soldering, or the like.

DETAILED DESCRIPTION OF PREFERRED EMBODIMENTS

Figure 1:
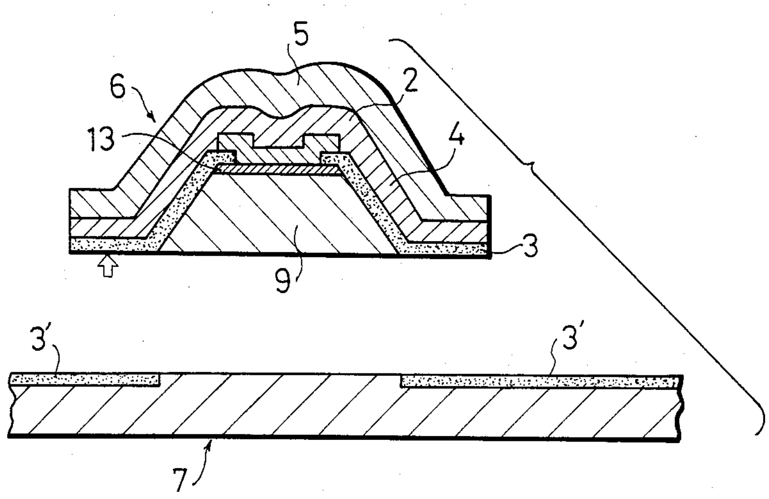
FIG. 1 is a sectional view showing a heating element and a lead wire portion constituting an embodiment of the thermal head according to the present invention.

As shown in FIG. 1, in an embodiment according to the present invention, a thermal head is arranged such that an undercoating film 13 for improving tightness of a heating resistor 2, a conductor film 3 extending towards the opposite sides of the substrate 9 so as to cover the outer portion thereof, a heating resistor film 2 on the conductor film 3, an oxidation resisting film 4 for preventing the heating resistor film 2 from being oxidized and a wear resisting film 5 for protecting the head are layered to form a heating portion 6 on a central raised stripe substrate 9 having a substantially trapenzoidal cross-section worked by anisotropy etching, or the like.

Especially, the conductor film 3 extending toward the opposite sides of the substrate 9 is exposed under the heating portion 6 because the conductor film 3 is formed under the heating resistor film 2, and therefore it is made possible to form the head in such a manner that the heating portion 6 is connected with a lead wire portion 7 which is separately previously prepared by forming lead wires 3 on an ordinarily used electrical insulator substrate 9 by an ordinarily performing method.

Figure 2:
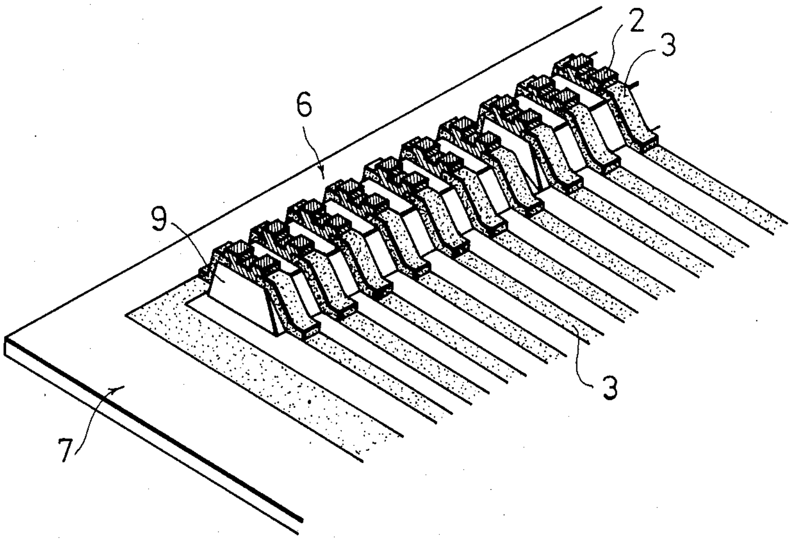
FIG. 2 is a perspective schematic diagram of an embodiment of the thermal head according to the present invention.

FIG. 2 is a perspective view of an embodiment of the thermal head produced according to the present invention. In order to simplify the drawing, an oxidation resisting film and a wear resisting film of the head are omitted in the drawing. As shown in this FIG. 2, it is possible to make the thermal head simply in a manner such that a heating element 6 constituted by a conductor 3, a heating resistor film 2, etc., formed on a substrate 9 having a substantially trapenzoidal cross-section is connected with a lead wire 3 of a lead line portion 7 which is separately produced, by soldering, or the like.

Referring to the drawings, the manufacturing process of the above-mentioned heating portion 6 will be described as to the case where a silicon monocrystal is used as a substrate material, for example.

Figure 3:
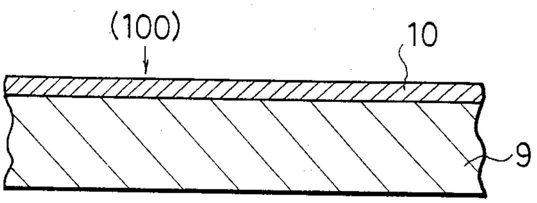
FIGS. 3 to 6 are sectional views in various steps in manufacturing the heating element shown in FIG. 1.
Figure 4:
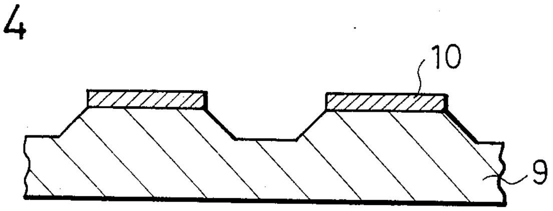
Figure 5:
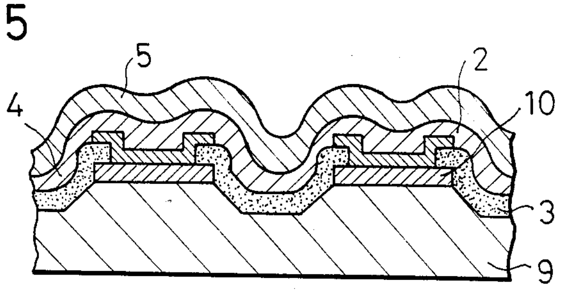
Figure 6:
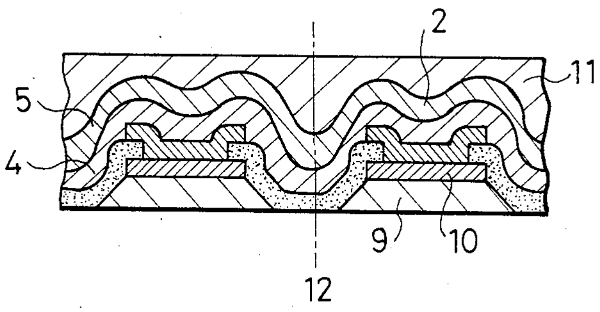
Figure 7:
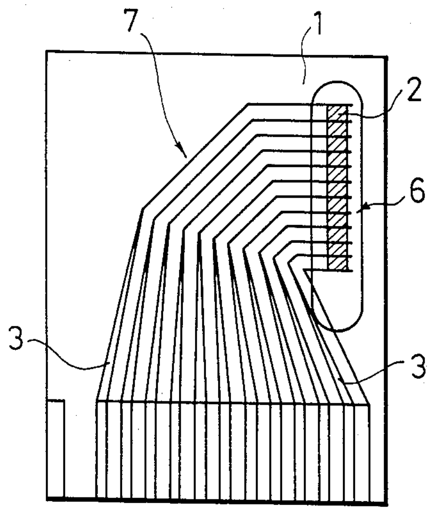
Fig. 7 PRIOR ART
FIG. 7 is a diagram showing a pattern in the conventional serial head.
Figure 8:
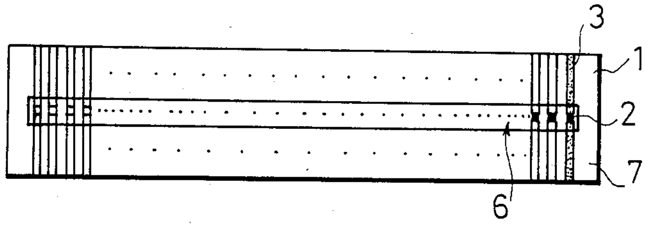
Fig. 8 PRIOR ART
FIGS. 8 and 9 are diagrams showing patterns in the conventional line heads.
Figure 9:
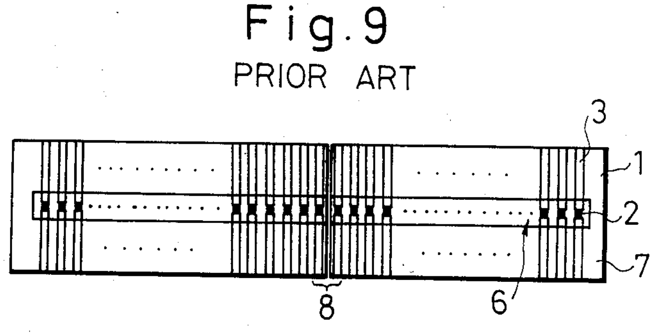
Fig. 9 PRIOR ART
Figure 10:
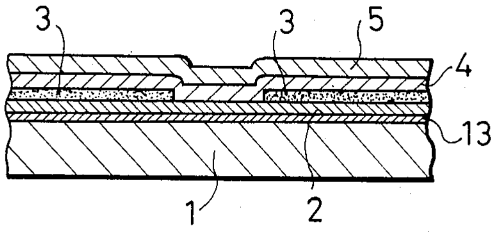
Fig.10 PRIOR ART
FIG. 10 is a sectional view showing the conventional thermal head.
Figure 11:
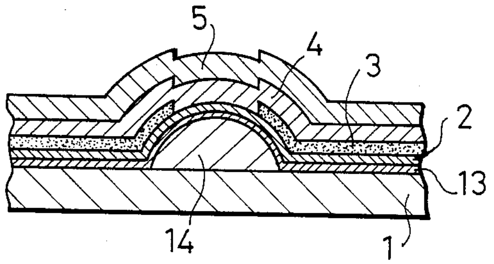
Fig.11 PRIOR ART
FIG. 11 is a sectional view showing the conventional thermal head employing a substrate having glaze glass.
Figure 12:
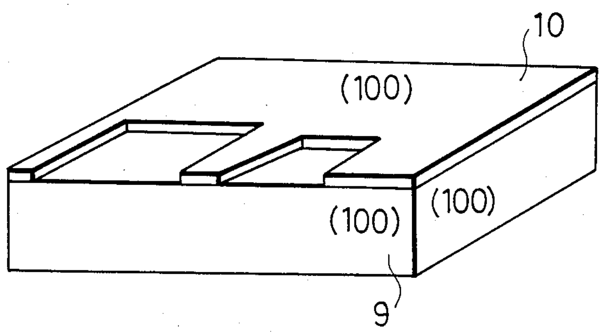
FIG. 12 is a perspective view showing a silicon substrate before performing anisotropy etching.
Figure 13:
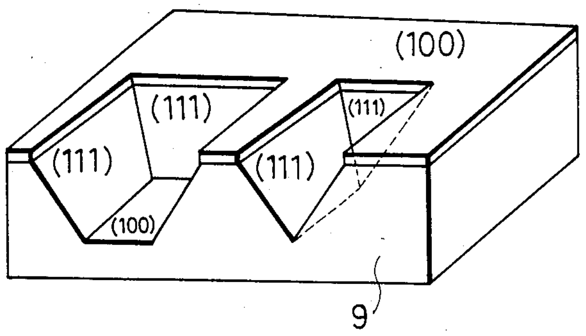
FIG. 13 is a perspective view showing a silicon substrate upon completion of anisotropy etching.

The substrate material is shaped in such a manner that a $SiO_2$ film 10 is formed on a silicon monocrystal substrate material having a crystal face "100" in the surface thereof, as a protection film against anisotropy etching, as shown in FIG. 3, a predetermined pattern is formed by a photo-lithographic technique, and a plurality of center-raised stripes are formed as shown in FIG. 4 by anisotropy etching. Then, a heating element having such an arrangement as shown in FIG. 5 is formed such that a heating portion 6 having a conductor film 3 and a heating resistor film 2 is formed by spattering, evaporation, or photo-lithography, and an oxidation resisting film 4 and a wear resisting film 5 are formed on the heating portion 6. In order to reinforce a film layered face, a reinforcing film 11 such as, for example, photoresist, which is easily removable in a later step is attached and the rear face of the substrate material 9 is teared off by etching or lapping till a conductor face is exposed as shown in FIG. 6. At last, the reinforcing film 11 is taken off and the heating element is divided into the respective individual center-raised stripes along the line 12 shown in FIG. 6. There is no substrate material left in a division portion in dividing so that it is possible to divide easily and accurately without distortion.

As described above in detail, the present invention makes it possible to manufacture a thermal head in such a manner that a heating element constituted by a heating portion and a lead wire portion are produced separately from each other, and thereafter the heating element is connected with the lead wire portion to thereby produce the thermal head by using a material having anisotropy and selectivity with respect to etching as a film-forming substrate material of the thermal head, whereby the filmforming efficiency with respect to the head by spattering or evaporation is remarkably improved, and, further, the separation of the heating element from the substrate can be easily and accurately accomplished by preventing crack or distortion from occurring because there is no substrate material portion in the division portion. That is, according to the present invention, it is possible to obtain such a thermal head that could not been produced with a prior art technique and there is an advantage that the manufacturing cost can be reduced remarkably.

According to the method of the present invention, since the heating element and the lead wire portion are separately produced, it is needless to say that both the serial head and line head can be produced easily and desiredly.

Further, in addition to the advantage that the reduction in manufacturing cost can be expected, the thermal head according to the present invention is advantageous in that it has good tightness and thermal response with respect to the recording paper even if no glass glaze is used in comparison with the conventional film type head having a flat substrate, because the substrate has center-raised stripes.

What is claimed is:

1. A method of manufacturing a thermal head comprising the steps of:

forming, by anistrophy etching, a plurality of center-raised stripes on a silicon monocrystal substrate having a face with anisotropy or selectivity with respect to etching;

forming at least a heating resistor film, a conductor film and a protection film on the surface of each of said center-raised stripes of said substrate;

making said plurality of center-raised stripes independent from each other by etching a face of said substrate opposite to the face on which said films are formed;

dividing the portion on which said films are formed for every center-raised stripe into heating portions; and connecting conductors of each of said heating portions to respectively corresponding lead wires of a lead wire portion prepared separately from said heating portion by forming said lead wires on an electrically insulating substrate.

* * * * *